Oct. 20, 1959 J. P. FAY 2,909,596

APPARATUS FOR MAGNETICALLY RECORDING ELECTRICAL WAVES

Filed April 7, 1954

INVENTOR
James P. Fay

BY Johnson and Kline
ATTORNEYS 2,909,596

APPARATUS FOR MAGNETICALLY RECORDING ELECTRICAL WAVES

James P. Fay, Norwalk, Conn., assignor to The Teletrak Corporation, Wilmington, Del., a corporation of Delaware Application April 7, 1954, Serial No. 421,533
4 Claims. (Cl. 178—6.6)

This invention relates to the recording and reproducing of electrical waves, and more particularly to the recording and reproducing of video and audio signals such as are involved in television systems and cover a relatively wide band width.

In the producing of television programs involving both video and audio signals, frequencies are encountered which range from less than 100 cycles per second, as for example from approximately 50 cycles per second, to over four megacycles per second, representing a span of between 16 and 17 octaves roughly. The audio signal usually has a band width the limits of which are approximately from 30 cycles per second to 15 kilocycles per second, representing between eight and nine octaves, and magnetic recording of such a smaller band width involves no difficulties. However, the video signal having a range of a large number of octaves, between 16 and 17, is not readily recorded on magnetic recording equipment, and accordingly the direct recording of television signals on such equipment is in general not feasible.

The above difficulty has been overcome by the present invention, which has for an object high fidelity magnetic recording of television signals even though these range as much as 17 octaves or more.

In accomplishing this object I provide a novel method and apparatus by which the video signal is divided into a number of component waves having narrower band widths than the original band width, at least one of said components having a narrower band width of a sufficiently small number of octaves to enable it to be readily handled by magnetic recording equipment. I impress another of said components on a carrier wave having a frequency outside of the band of the one component but closely adjacent said band in terms of octaves. I also impress the audio signal on a carrier wave having a frequency outside of the band of the said one component but also closely adjacent the band thereof in terms of octaves, said second carrier wave being of a different frequency from the first carrier. I then feed the modulated carrier waves and also the said one component wave of narrower band width to a mixer, by which a composite wave is produced which is suitable as an input to a magnetic recording device. The composite wave can be between eight and nine octaves in band width, a spread readily handled by magnetic equipment as compared with the band width of 16 to 17 octaves characterizing the video signal.

In reproducing the recorded composite electrical wave, the audio and video modulated carrier waves are separated or divided out and demodulated, the audio modulation being a faithful reproduction of the original audio signal and being readily capable of reproduction into sound. The video-modulation wave, having a band spread of between eight and nine octaves, is combined with that portion of the composite wave which remains after the separation of the modulated carriers therefrom, and the resultant wave constitutes the video signal having a band width of the same order of magnitude as the original, between 16 and 17 octaves. This resultant video signal is readily handled by suitable equipment, for activation of a cathode ray tube for example.

Where it is desired that video signals alone be recorded and reproduced without any accompanying audio signals, this may be readily accomplished by my invention, by merely splitting up the video signals into component waves of narrower band widths and thereafter modulating carriers with some of said waves in such a manner that the modulated carriers may be readily combined with other of the component waves to produce a resultant having a much narrower band width in terms of octaves, well within the ability of the magnetic recording apparatus.

While in the embodiment of the invention illustrated and described herein video and audio signals are recorded and reproduced, it is understood that the invention is not limited to these particular signals or similar bands covered thereby, but instead has a scope as embraced by the appended claims.

A feature of the invention resides in the simplicity and arrangement of the component devices by which the magnetic recording of signals of relatively great band width is accomplished.

Other features and advantages will hereinafter appear.

Figure 1:
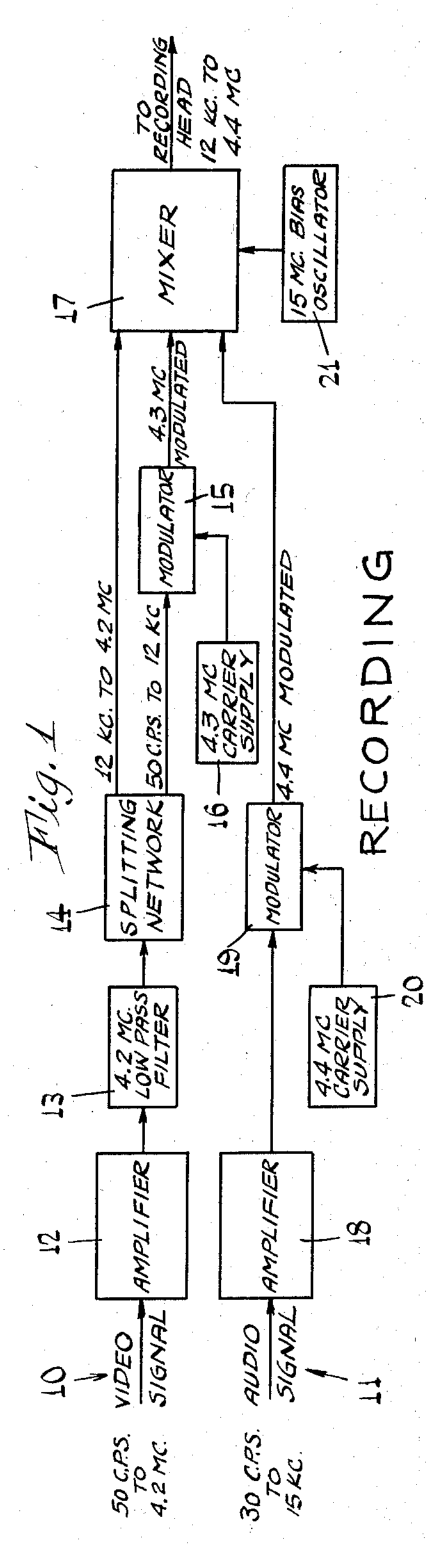
Figure 1 is a block diagram showing one embodiment of the invention wherein video and audio signals are processed to enable them to be faithfully recorded by magnetic recording equipment.

Referring to Fig. 1, there is indicated in the leftmost portion of the figure a circuit means carrying a video signal 10 having a frequency of from 50 cycles per second to 4.2 megacycles per second. The band spread represented by these frequencies is between 16 and 17 octaves, this number being considered herein as large since it is greater than the effective range of a magnetic recorder. There is also represented in the leftmost portion of Fig. 1 a circuit means having an audio signal 11 of from 30 cycles per second to 15 kilocycles per second, this band spread embracing a smaller number of octaves, between eight and nine. Such a smaller band spread may be readily handled by magnetic recording equipment, as is well understood.

The video signal 10 is fed to an amplifier 12, and the amplified video signal brought to a low-pass filter 13 which may be designed to pass no frequencies above 4.2 megacycles. The filter 13 thus filters the output of the amplifier 12 in this respect. From the filter 13 the video signal passes to a splitting network 14 with proper phase equalization which divides the wave into a pair of component waves one of which has a frequency of from 12 kilocycles per second to 4.2 megacycles per second and the other of which has a frequency of from 50 cycles per second to 12 kilocycles per second. The band spreads of both said component waves are thus between eight and nine octaves. The 50 c.p.s. to 12 kc. wave is fed to a modulator 15, supplied with a 4.3 mc. carrier wave from a carrier supply 16, and made to modulate the carrier. The resultant 4.3 mc. modulated carrier wave and the component wave of frequency between 12 kc. and 4.2 mc. are fed to a mixer 17, by which a composite wave may be produced having a frequency of from 12 kc. to 4.3 mc. The mixer 17 is also fed a wave modulated by the audio signal 11. As shown, the signal 11 passes through an amplifier 18 to a modulator 19 which is fed a 4.4 mc. carrier wave from a carrier supply 20. The 4.4 mc. modulated wave is then fed into the mixer 17, the latter being supplied with 15 mc. bias voltage from an oscillator 21.

The composite wave from the mixer 17 thus has a frequency band of from 12 kc. to 4.4 mc., representing a span of from eight to nine octaves. This composite wave may be fed to a magnetic recording head, which can readily handle and faithfully record this relatively small span of eight to nine octaves. Such a recording device is shown in my copending application, Serial No. 383,327, filed September 30, 1953, and issued October 8, 1957 as Patent No. 2,809,238.

It will be understood that if it is desired merely to record the video signal 10 the apparatus associated with the audio signal 11 comprising the amplifier 18, modulator 19 and carrier oscillator 20 may be dispensed with. The mixer 17 will then produce a composite wave having a frequency band of from 12 kc. to 4.3 mc.

The video signal 10 may, in accordance with the invention, be further subdivided and the resultant components made to modulate additional carrier waves; however, for the sake of simplicity of illustration only two components of the original video signal are disclosed, one of which modulates a carrier wave.

Figure 2:
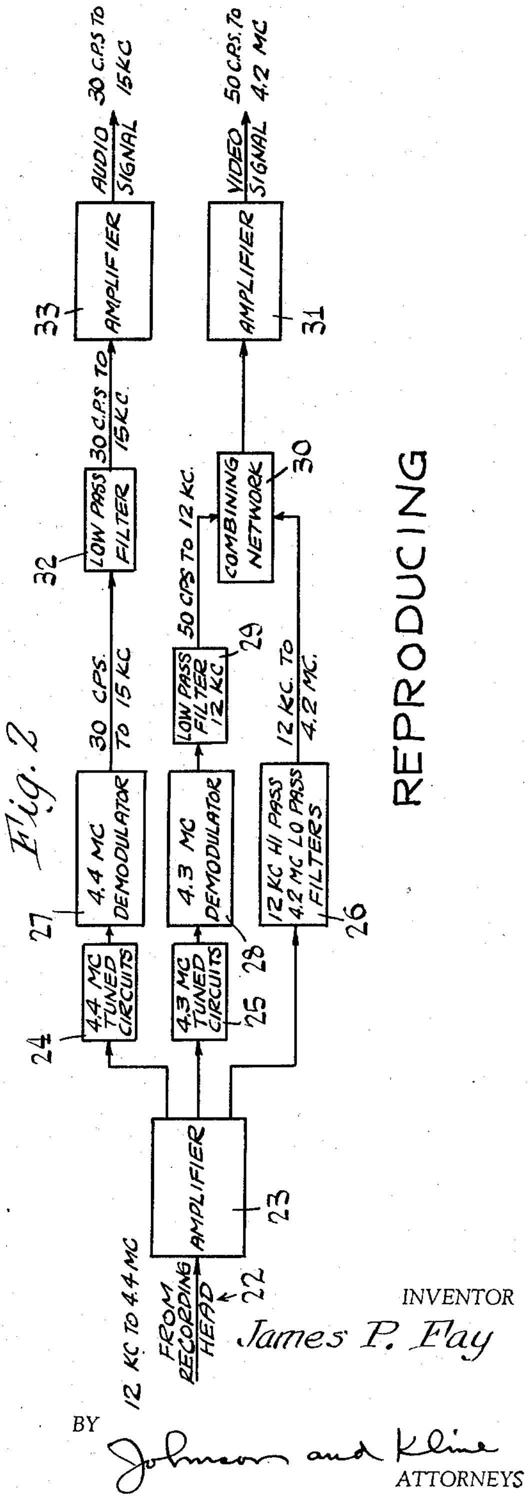
Fig. 2 is a block diagram of an embodiment of the invention wherein a signal from the recording equipment is divided and demodulated and further processed to produce the original audio and video signals.

In the reproducing of the recorded signal the apparatus shown in Fig. 2 is employed. A composite signal 22 from the recording head, having a band spread of between eight and nine octaves and a frequency variation of from 12 kc. to 4.4 mc. is fed to an amplifier 23. The output of the amplifier 23 is impressed on a 4.4 mc. tuned circuit 24, a 4.3 mc. tuned circuit 25 and a filter 26 of 12 kc. high-pass characteristic and 4.2 mc. low-pass characteristic. From the tuned circuit 24 the 4.4 mc. wave is fed to a demodulator 27 by which an audio signal of from 30 c.p.s. to 15 kc. is produced, with the band spread roughly between eight and nine octaves. From the 4.3 mc. tuned circuit 25 the 4.3 mc. wave is fed to a demodulator 28 and thereafter to a low-pass 12 kc. filter 29, by which a video signal of from 50 c.p.s. to 12 kc. is produced, representing a band spread of roughly between eight and nine octaves. From the high-pass and low-pass filters 26 a video signal of from 12 kc. to 4.2 mc. is obtained, representing a spread of between eight and nine octaves, and this signal is fed to a combining network 30, together with the signal from the low-pass filter 29. The composite wave from the network 30, representing the video signal, is then fed to an amplifier 31 whose output comprises a final signal of from 50 c.p.s. to 4.2 mc., a band spread of between 16 and 17 octaves.

The audio signal from the demodulator 27 passes through a 15 kc. low-pass filter 32 and is impressed on an amplifier 33 which provides a strong audio signal of from 30 c.p.s. to 15 kc., a spread of between eight and nine octaves.

It is understood that the filters 32 and 29 filter the outputs of the demodulators 27 and 28 respectively, and do not allow frequencies above 15 kc. and 12 kc. respectively to pass, and the filter network 26 filters the output of the amplifier 23, suppressing frequencies above 4.2 mc. or below 12 kc.

The output of the apparatus of Fig. 2 thus comprises video and audio signals having essentially the same band widths, frequencies and characteristics as the video and audio signals initially fed to the apparatus of Fig. 1 and thereafter processed and magnetically recorded.

It will be understood that if the signal from the recording head which is fed to the amplifier 23 does not have a 4.4 mc. modulated component, representing the audio signal, then the audio apparatus comprising the tuned circuits 24, demodulator 27, filter 32, and amplifier 33, are not necessary. In such event the reproducing apparatus of Fig. 2 will merely reproduce the video signal.

The method and apparatus of my invention as illustrated and described above is extremely simple and effective, and enable complete television programs or other signals having an extremely wide band spread to be readily and faithfully recorded on magnetic recording equipment of limited range.

Variations and modifications may be made within the scope of the claims and portions of the improvements may be used without others.

I claim:

1. In an apparatus for use in transmitting, recording a variable frequency electric signal having frequency limits defining a band width having a greater number of octaves than can be readily transmitted or recorded; means for reducing said band to an octave range which can be readily recorded comprising means for dividing off a predetermined segment of the signal at the upper end of the band of frequencies having a number of octaves less than the number that can be readily transmitted and recorded, means applying the remainder of the band to a carrier having a frequency slightly greater than the highest frequency of the retained band to modulate said carrier, and means combining said retained band and carrier to produce a recordable signal having a number of octaves which can be readily recorded.

2. In an apparatus for use in recording a variable frequency electric signal having frequency limits defining a band width from 50 c.p.s. to 4.2 mc. and having a greater number of octaves than can be readily transmitted or recorded; means for reducing said band to an octave range which can be readily recorded comprising means for dividing off that portion of the signal above 12 kc. to form a signal having a number of octaves less than the number that can be readily transmitted and recorded, means applying the remainder of the band to a carrier having a frequency of 4.3 mc. to modulate said carrier, and means combining said retained band and carrier to produce a recordable signal having a number of octaves which can be readily recorded.

3. In an apparatus for use in recording a variable frequency electric signal having frequency limits between 50 c.p.s. and 4.2 mc. and defining a band width of over 16 octaves; means for reducing said band to an octave range of approximately 8 octaves which can be readily recorded comprising means for dividing off a segment of the signal at the upper end of the band of frequencies having approximately 8 octaves to provide a retained band that can be readily transmitted and recorded, means applying the remainder of the original band to a carrier having a frequency slightly greater than 4.2 mc. to modulate said carrier, the frequency of said carrier being such that when added to the retained band it will not increase the octave range of said band, and means combining said retained band and carrier to produce a recordable signal having substantially 8 octaves which can be readily recorded.

4. In an apparatus for use in recording a television signal having a video signal from 50 c.p.s. to 4.2 mc. and an audio signal from 30 c.p.s. to 15 kc. and forming a band width having a greater number of octaves than can be readily transmitted or recorded; means for reducing said band to an octave range which can be readily recorded comprising means for dividing off a retained band of said video signal between 12 kc. to 4.2 mc. to provide a recordable band of frequencies, means applying the portion of the video signal between 50 c.p.s. and 12 kc. to a carrier having a frequency of 4.3 mc. to modulate the carrier, means applying the audio signal to a second carrier having a frequency of 4.4 mc. to modulate said carrier, and means combining said retained band and carriers to produce a recordable signal having a number of octaves which can be readily recorded.

References Cited in the file of this patent

UNITED STATES PATENTS

| | | |
|---|---|---|
| 1,769,920 | Gray | July 8, 1930 |
| 1,778,759 | Gilbert | Oct. 21, 1930 |
| 2,132,205 | Dickieson | Oct. 4, 1938 |
| 2,236,502 | Goldsmith | Apr. 1, 1941 |
| 2,335,180 | Goldsmith | Nov. 23, 1943 |
| 2,408,692 | Shore | Oct. 1, 1946 |
| 2,517,808 | Sziklai | Aug. 8, 1950 |